(12) United States Patent
Saji et al.

(10) Patent No.: US 8,099,744 B2
(45) Date of Patent: Jan. 17, 2012

(54) DISK DEVICE

(75) Inventors: Yoshito Saji, Ashiya (JP); Kozo Ezawa, Hirakata (JP); Takeo Santo, Hirakata (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/016,266

(22) Filed: Jan. 28, 2011

(65) Prior Publication Data

US 2011/0138407 A1 Jun. 9, 2011

Related U.S. Application Data

(62) Division of application No. 10/554,942, filed on Oct. 31, 2005, now Pat. No. 7,904,918.

(51) Int. Cl.
*G11B 17/04* (2006.01)
(52) U.S. Cl. ........ 720/703; 720/604; 720/706; 720/710; 720/712
(58) Field of Classification Search .................. 720/604, 720/695, 696, 703, 710, 712
See application file for complete search history.

(56) References Cited

U.S. PATENT DOCUMENTS

| | | |
|---|---|---|
| 4,823,337 A | 4/1989 | Van Zanten et al. |
| 5,050,159 A | 9/1991 | Kenmotsu |
| 5,121,379 A | 6/1992 | Funabashi et al. |
| 5,719,849 A | 2/1998 | Hiraga |
| 5,917,802 A | 6/1999 | Konno |
| 6,104,694 A | 8/2000 | Hake |
| 6,430,145 B1 | 8/2002 | Morimoto et al. |
| 6,477,121 B1 | 11/2002 | Sato et al. |
| 6,721,263 B1 | 4/2004 | Ota et al. |
| 6,868,546 B2 | 3/2005 | Arai et al. |
| 6,928,045 B2* | 8/2005 | Eum et al. .................. 369/270.1 |
| 2001/0015951 A1* | 8/2001 | Yabushita ..................... 369/270 |
| 2002/0150027 A1* | 10/2002 | Kato ............................. 369/270 |
| 2003/0123377 A1 | 7/2003 | Eum et al. |
| 2003/0147337 A1 | 8/2003 | Kim |
| 2003/0235130 A1* | 12/2003 | Wang .......................... 369/75.2 |

FOREIGN PATENT DOCUMENTS

| | | |
|---|---|---|
| JP | 56-114166 | 9/1981 |
| JP | 2-172055 | 7/1990 |
| JP | 8-147836 | 6/1996 |
| JP | 8-221860 | 8/1996 |
| JP | 2003-187510 | 7/2003 |
| JP | 2003-242702 | 8/2003 |

OTHER PUBLICATIONS

International Search Report issued Nov. 9, 2004 in corresponding International (PCT) Application PCT/JP2004/010694.

* cited by examiner

*Primary Examiner* — Daniell L Negron
*Assistant Examiner* — Carlos E Garcia
(74) *Attorney, Agent, or Firm* — Wenderoth, Lind & Ponack, L.L.P.

(57) ABSTRACT

A low-cost disk device with which the same spindle motor and clamper can be used for different types of disk device, such as a DVD drive. A clamper includes a clamper main body and a plurality of positioning components. The clamper main body clamps a disk between itself and a spindle motor that holds and rotates the disk. The plurality of positioning components are formed on the clamper main body for the relative positioning of the clamper main body and each of the plurality of spindle motors in the radial direction.

5 Claims, 12 Drawing Sheets

(a)

(b)

(a)

(b)

(a)

(b)

DISK DEVICE

CROSS-REFERENCE TO RELATED APPLICATION

This application is a divisional of U.S. application Ser. No. 10/554,942, filed Oct. 31, 2005 now U.S. Pat. No. 7,904,918, the entirety of which is incorporated herein by reference.

BACKGROUND OF THE INVENTION

I. Technical Field

The present invention relates to a disk device for recording and reading information to or from a disk-shaped recording medium such as an optical disk or an opto-magnetic disk, as well as to a spindle motor that centers and rotates a disk, and a clamper that clamps a disk between itself and the spindle motor.

II. Description of the Related Art

With a conventional disk device, the most common method for attaching a disk to a rotating spindle motor is to clamp the disk between the spindle motor and a clamper chucked to the spindle motor. The disk is usually centered by fitting its center hole onto a boss of the spindle motor, in order that the head that writes and reads information to and from the rotating disk will stay as still as possible. However, because the clamper itself has weight, it is most often centered with respect to the spindle motor just as the disk is, in order to avoid vibration. A method for centering a clamper with respect to a spindle motor is disclosed in JP S56-114166(A), in which a convex component provided in the rotational center of a spindle motor mates with a concave component provided in the center of a clamper, and another such method is disclosed in JP H2-172055(A), in which a convex component provided in the center of a clamper mates with a concave component provided in the rotational center of a spindle motor.

However, the above-mentioned conventional structures are both designed so that there is a one-to-one correspondence in the centering between the spindle motor and the clamper. In recent years, meanwhile, the skyrocketing consumer demand for DVD recording and reproduction devices rather than video tape devices has led to a surge in the production of disk devices, and this popularity has also created the need for cost reductions. Nevertheless, with a conventional structure in which the spindle motor and the clamper are in a one-to-one correspondence as above, every time a new type of device is developed, a new spindle motor and clamper have to be designed and produced, which is a problem in that it impedes efforts at reducing cost.

SUMMARY OF THE INVENTION

It is an object of the present invention to solve the above problems and provide a clamper that can be used in combination with different kinds of spindle motors, and a spindle motor that can be used in combination with different kinds of clampers.

The clamper according to a first aspect of the present invention comprises a clamper main body and a plurality of positioning components. The clamper main body clamps a disk between itself and a spindle motor that holds and rotates the disk. The plurality of positioning components are formed on the clamper main body for the relative positioning of the clamper main body and one of a plurality of spindle motors in the radial direction.

The present invention provides a clamper that can be used in combination with a plurality of spindle motors. Furthermore, the clamper of the present invention can be relatively centered with respect to a plurality of spindle motors.

The clamper according to a second aspect of the present invention is the clamper according to the first aspect, wherein the plurality of positioning components include a convex component and an annular inclined concave component. The convex component fits into a hole provided in the rotational center of a first spindle motor, for positioning in the radial direction of the clamper main body. The annular inclined concave component mates with an annular inclined convex component provided in the rotational center of a second spindle motor, for positioning in the radial direction of the clamper main body.

The hole is provided, for example, in the rotational center of the turntable of the spindle motor. The annular inclined convex component is provided, for example, on a boss or the like on the turntable of the spindle motor.

The present invention provides a clamper that can be used in combination with a first spindle motor equipped with a hole, and a second spindle motor equipped with an annular inclined convex component.

The clamper according to a third aspect of the present invention is the clamper according to the first aspect, wherein the plurality of positioning components includes first and second convex components. The first convex component fits into a first hole provided in the rotational center of a first spindle motor, for positioning in the radial direction of the clamper main body. The second convex component is larger in diameter than the first convex component and fits into a second hole provided in the rotational center of a second spindle motor, for positioning in the radial direction of the clamper main body.

The first and second holes are provided, for example, in the rotational center of the turntable of the first and second spindle motors.

The present invention provides a clamper that can be used in combination with a first spindle motor equipped with a first hole, and a second spindle motor equipped with a second hole.

The clamper according to a fourth aspect of the present invention is the clamper according to the first aspect, wherein the plurality of positioning components includes a hole and an annular inclined concave component. The hole mates with a columnar convex component provided in the rotational center of a first spindle motor, for positioning in the radial direction of the clamper main body. The annular inclined concave component mates with an annular inclined convex component provided in the rotational center of a second spindle motor, for positioning in the radial direction of the clamper main body.

The columnar convex component is provided, for example, in the rotational center of the turntable of a first spindle motor. The annular inclined convex component is provided, for example, to a boss or the like on the turntable of a second spindle motor.

The present invention provides a clamper that can be used in combination with a first spindle motor equipped with a columnar convex component, and a second spindle motor equipped with an annular inclined convex component.

A spindle motor according to a fifth aspect of the present invention comprises a disk holding component and a motor main body. The disk holding component has a main body and a plurality of positioning components. The main body holds a disk between itself and a clamper. The plurality of positioning components are formed on the main body, for the relative positioning of the main body and one of a plurality of clampers in the radial direction. The motor main body is fixed to the disk holding component and rotationally drives the disk holding component and the disk.

The disk holding component is formed, for example, by the turntable of the spindle motor.

The present invention provides a spindle motor that can be used in combination with a plurality of clampers. Furthermore, the spindle motor of the present invention affords relative centering with respect to a plurality of clampers.

The spindle motor according to a sixth aspect of the present invention is the clamper according to the fifth aspect, wherein the plurality of positioning components includes a hole and an annular inclined convex component. The hole is provided in the rotational center and mates with a convex component provided in the rotational center of a first clamper, for positioning in the radial direction of the first clamper. The annular inclined convex component mates with an annular inclined concave component provided on a second clamper, for positioning in the radial direction of the second clamper.

The hole is provided, for example, in the rotational center of the turntable of the spindle motor. The annular inclined convex component is provided, for example, to a boss or the like of the turntable of the spindle motor.

The present invention provides a spindle motor that can be used in combination with a first convex component equipped with a convex component, and a second convex component equipped with an annular inclined concave component.

The spindle motor according to according to a seventh aspect of the present invention is the clamper according to the fifth aspect, wherein the plurality of positioning components includes a first hole and a second hole. The first hole is provided in the rotational center and mates with a first convex component provided in the rotational center of a first clamper, for positioning in the radial direction of the first clamper. The second hole is larger in diameter than the first hole and mates with a second convex component provided in the rotational center of a second clamper, for positioning in the radial direction of the second clamper.

The first and second holes are provided, for example, in the rotational center of the turntable of the spindle motor.

The present invention provides a spindle motor that can be used in combination with a first convex component equipped with a first convex component, and a second convex component equipped with a second convex component.

The clamper or spindle motor according to an eighth aspect of the present invention is the clamper according to the second, fourth, or sixth aspects, wherein the annular inclined convex component fits into the center hole of the disk when the disk is placed on the spindle motor.

The annular inclined convex component is provided, for example, to a boss of the turntable of the spindle motor, and guides the disk when the disk is installed.

The present invention facilitates disk installation because the disk is guided by the annular inclined convex component.

The clamper according to a ninth aspect of the present invention comprises a clamper main body and a plurality of positioning components. The clamper main body clamps a disk between itself and a spindle motor that holds and rotates the disk. The plurality of positioning components are formed on the clamper main body for relative positioning in the axial direction when the clamper main body and one of a plurality of spindle motors are in a chucked state with no disk clamped therebetween.

The present invention provides a clamper that can be used in combination with a plurality of spindle motors, and also makes possible the proper relative axial positioning of the clamper and the spindle motor in a chucked state in which the disk is not clamped.

The clamper according to a tenth aspect of the present invention is the clamper according to the ninth aspect, wherein the plurality of positioning components includes a first restricting component and a second restricting component. The first restricting component has an annular axial direction face and is provided in the rotational center. The second restricting component is a concave truncated conical component and is disposed concentrically with the first restricting component.

The present invention provides a clamper that can be used, for example, in combination with a spindle motor equipped with a restricting component that is opposite the annular axial direction face of the first restricting component in the rotational center of the turntable, and a spindle motor equipped with a concave truncated conical component that is opposite a second restricting component.

The spindle motor according to an eleventh aspect of the present invention comprises a disk holding component and a motor main body. The disk holding component has a main body and a plurality of positioning components. The main body holds a disk between itself and a clamper. The plurality of positioning components are formed on the main body for relative positioning in the axial direction when the main body and one of a plurality of clampers are in a chucked state with no disk clamped therebetween. The motor main body is fixed to the disk holding component and rotationally drives the disk holding component and the disk.

The present invention provides a spindle motor that can be used in combination with a plurality of clampers, and also makes possible the proper relative axial positioning of the clamper and the spindle motor in a chucked state with no disk clamped therebetween.

The spindle motor according to a twelfth aspect of the present invention is the clamper according to the eleventh aspect, wherein the plurality of positioning components includes a first restricting component and a second restricting component. The first restricting component has an annular axial direction face and is provided in the rotational center. The second restricting component is a convex truncated conical component and is disposed concentrically with the first restricting component.

The present invention provides a spindle motor that can be used in combination with a clamper equipped with a rotational center that is opposite the annular axial direction face of the first restricting component, and a clamper equipped with a concave truncated conical component that is opposite the second restricting component.

As described above, with the spindle motor and clamper of the present invention, a single clamper can be used in combination with different kinds of spindle motor. Also, a single spindle motor can be used in combination with different kinds of clamper. As a side benefit, unlike with a conventional constitution in which the spindle motor and clamper were in a one-to-one correspondence, it is possible to use an existing spindle motor or clamper even when new types of device are developed, allowing disk devices to be provided at lower cost.

DETAILED DESCRIPTION OF THE INVENTION

Figure 1:
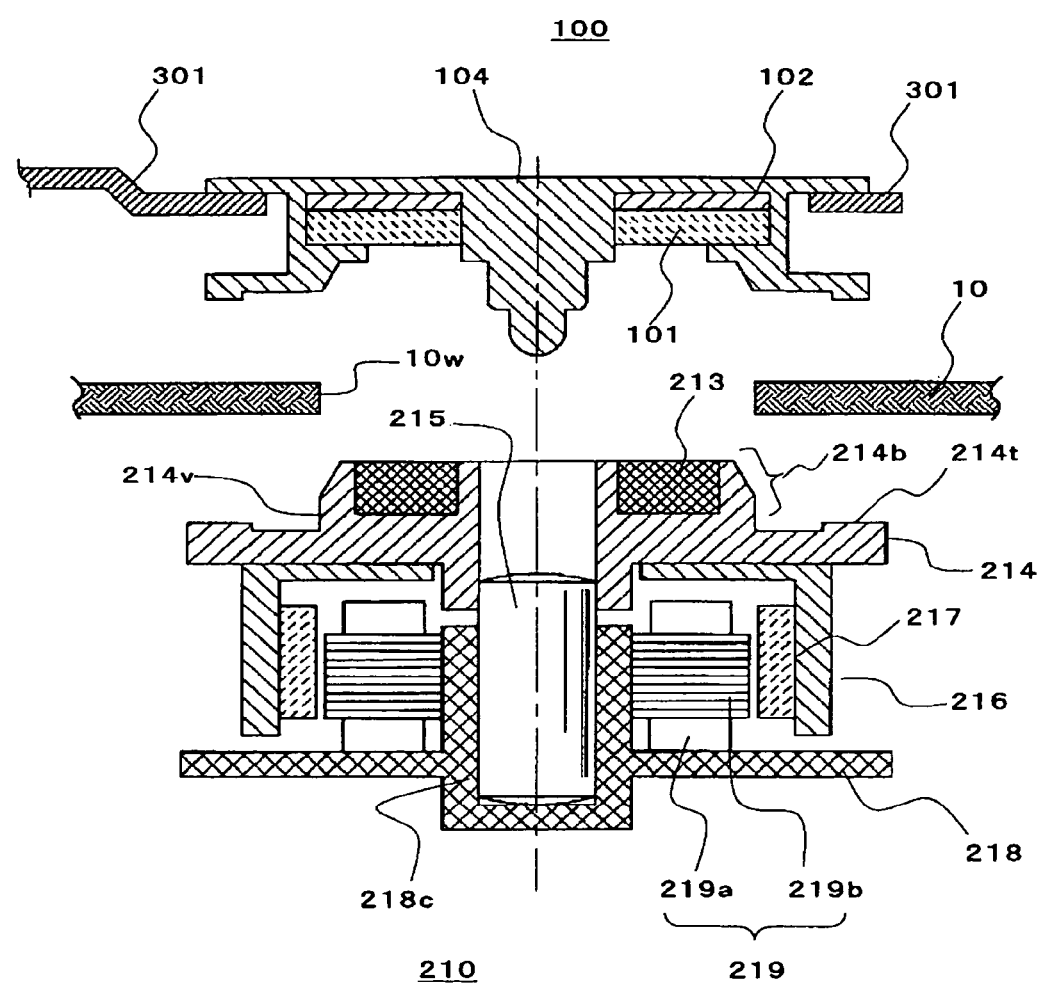
FIG. 1 is a lateral cross section of the main components of the spindle motor and clamper in Embodiment 1 of the present invention.

Embodiments of the present invention will now be described through reference to the drawings. For the sake of convenience, the up and down direction in the drawings is described as the axial direction, while the left and right direction is described as the radial direction, but this is not intended to limit the direction in which the clamper, spindle motor, etc., shown in the drawings are attached.

Embodiment 1

FIG. 1 is a lateral cross section of the main components when the clamper in Embodiment 1 of the present invention is used in combination with a certain spindle motor.

In FIG. 1, 10 is a disk, 100 is a clamper, and 210 is a spindle motor. A center hole 10w for performing centering is made near the center of the disk 10. The clamper 100 includes a clamper main body 104 made by resin molding or the like, and a magnet 101 and back yoke 102 that are fitted into the clamper main body 104. The clamper 100 is supported by a clamper holder 301 provided on a disk device (not shown). The spindle motor 210 includes a stator 218 fixed to the disk device (not shown), a magnetic core 219a disposed in the interior of this stator 218, a stator coil 219b wound around the magnetic core 219a, a motor shaft 215 rotatably supported in a bearing 218c of the stator 218, a turntable 214 fixed to the motor shaft 215, a chucking plate 213 made of a magnetic material such as an iron plate that is fitted into the turntable 214, a rotor case 216 fixed to the turntable 214 and the motor shaft 215, and a rotor magnet 217 attached to the rotor case 216. Therefore, the spindle motor 210 is designed such that when current is applied to the stator coil 219b, the turntable 214, the motor shaft 215, the rotor case 216, and the rotor magnet 217 can be rotated with respect to the stator 218.

The center of the disk 10 is positioned in the radial direction by fitting the center hole 10w over a peripheral side face 214v of a boss 214b of the turntable 214, and at the same time, the disk 10 is placed on a disk receiving surface 214t of the turntable 214, which completes its positioning with respect to the spindle motor 210. When the clamper holder 301 descends in order to fix the disk 10 on the turntable 214, the clamper 100 is chucked to the spindle motor 210 side by the magnetic force of the magnet 101 and the chucking plate 213, and the disk 10 is pressed against the disk receiving surface 214t and thereby fixed on the turntable 214. Since the clamper holder 301 descends away from the clamper 100 at this point, the clamper 100 can rotate without touching the clamper holder 301.

When the disk 10 is thus integrally attached to the turntable 214, the spindle motor 210 is driven to rotate the turntable 214 and the disk 10, and information can be recorded to or read from the disk 10 by a head (not shown).

Figure 2:
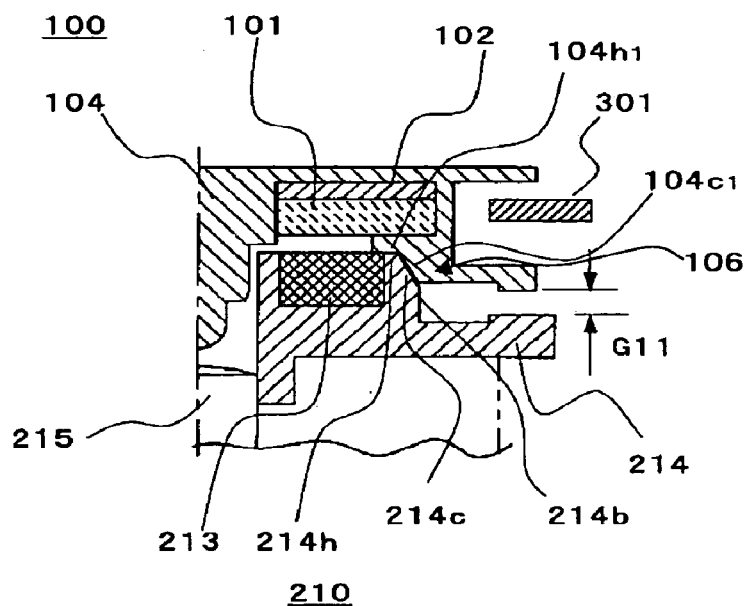
FIG. 2 is a partial lateral cross section of the state when the spindle motor and clamper in FIG. 1 have been chucked.
Figure 2:
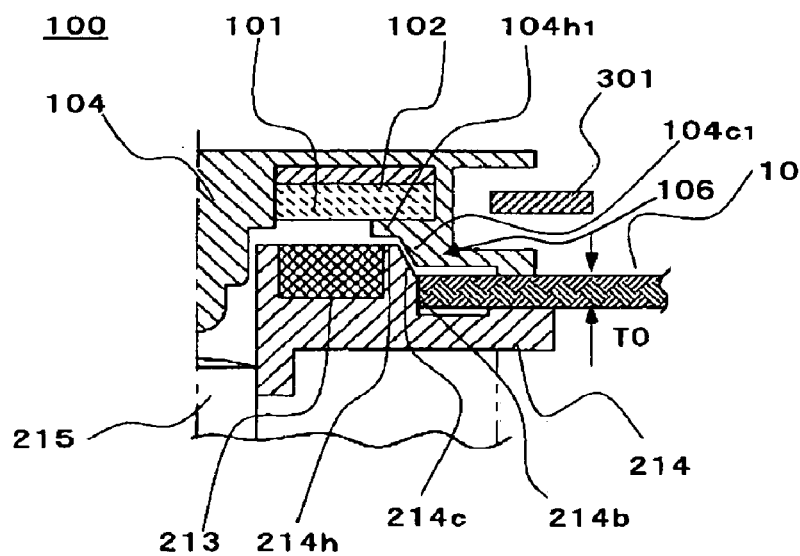

FIG. 2 is a partial lateral cross section of the state when the spindle motor and clamper in FIG. 1 have been chucked. Those constituent elements in FIG. 2 that are the same as in FIG. 1 are numbered the same and will not be described again. When the clamper 100 and spindle motor 210 have been chucked when there is no disk 10, as shown in FIG. 2a, a height restricting face 104h1 provided on the clamper main body 104 hits a ceiling face 214h of the boss 214b of the turntable 214, positioning the clamper 100 in the axial direction (hereinafter referred to as height positioning).

The height restricting face 104h1 is an annular face that is oriented downward in the axial direction, and is formed on an annular positioning component 106 provided on the outer peripheral side of the clamper main body 104 and on the lower side in the axial direction. The annular positioning component 106 primarily includes the height restricting face 104h1 and a concave conical component 104c1 having an inclined face that spreads out downward in the axial direction. As a result, the annular positioning component 106 constitutes a concave truncated conical component disposed concentrically with the rotational center.

The ceiling face 214h is an annular face provided on the axial direction upper side of the boss 214b. A truncated conical shape 214c having an inclined face that extends while spreading out downward in the axial direction from the outer peripheral edge of the ceiling face 214h is formed on the boss 214b. As a result, the boss 214b constitutes a convex truncated conical component disposed concentrically with the rotational center.

The height restricting face 104h1 and the ceiling face 214h maintain a suitable distance between the magnet 101 and the chucking plate 213, which prevents the clamper 100 and the spindle motor 210 from being subjected to excessive chucking force, so the clamper 100 can be pulled away with less force, and this reduces the noise produced by pulling the clamper 100 away. The distance G11 (disk holding gap) between the turntable 214 and the clamper 100 here is less than the thickness T0 of the thinnest disk 10 that is used, so even the thinnest of disks can be held. The height positioning of the clamper 100 serves two purposes: preventing excessive chucking force, and ensuring a disk holding gap at which even the thinnest of disks can be held.

When the clamper 100 and the spindle motor 210 are chucked with the disk 10 sandwiched in between, as shown in FIG. 2b, the concave conical component 104c1 provided on the clamper main body 104 concentrically with the center of the clamper 100 mates with the truncated conical shape 214c provided on the boss 214b that is concentric with the rotational center of the spindle motor 210, positioning the clamper 100 in the radial direction (hereinafter referred to as centering).

This reduces vibration caused by imbalance of the clamper 100 when the spindle motor 210 is rotated. The off-centeredness of the clamper 100 and the spindle motor 210 caused by looseness between the truncated conical shape 214c and the concave conical component 104c1 here must be low enough that not only will rotation of the spindle motor 210 cause no vibration, but also the clamper 100 will not touch the clamper holder 301.

Figure 3:
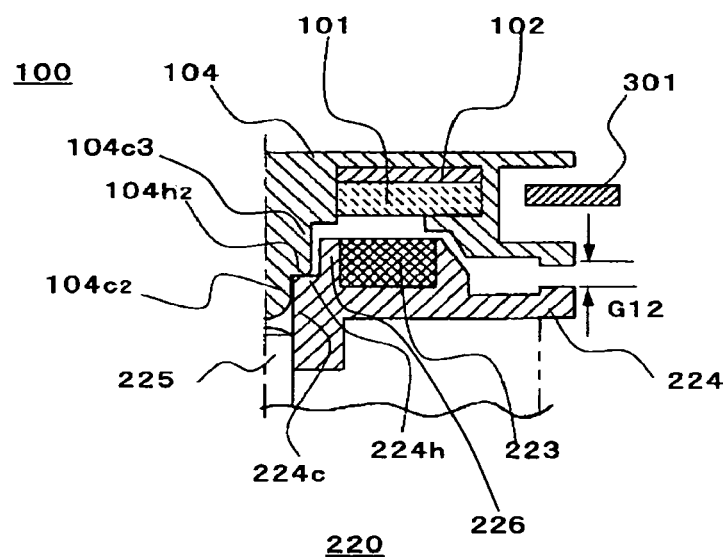
FIG. 3 is a partial lateral cross section of when the clamper in FIG. 2 is used in combination with another spindle motor.
Figure 3:
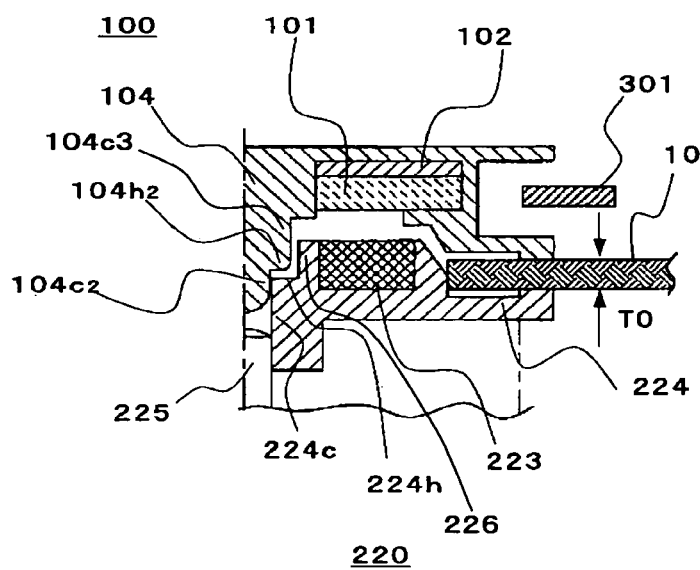

FIG. 3 is a partial lateral cross section of the main components when the clamper 100 in FIG. 2 is used in combination with another spindle motor 220. Those constituent elements in FIG. 3 that are the same as in FIG. 2 are numbered the same and will not be described again. When the clamper 100 and spindle motor 220 have been chucked when there is no disk 10, as shown in FIG. 3a, a height restricting face 104$h$2 provided on the clamper main body 104 hits a step face 224$h$ provided on the turntable 214, thereby performing the height positioning of the clamper 100.

The height restricting face 104$h$2 is an annular axial direction face that connects the outer peripheral faces of a first convex component 104$c$2 and a second convex component 104$c$3 had by a protrusion protruding at the rotational center of the clamper main body 104. The second convex component 104$c$3 here is a columnar component provided concentrically with the rotational center of the clamper main body 104. The first convex component 104$c$2 is a member provided concentrically adjacent on the axial direction lower side of the second convex component 104$c$3, and is smaller in diameter than the second convex component 104$c$3.

The step face 224$h$ is an annular axial direction face that connects the inner peripheral face of a hole 224$c$ provided in the rotational center of a turntable 224 and the inner peripheral face of an annular component 226 that is adjacent on the axial direction upper side of the hole 224$c$ and is larger in diameter than the hole 224$c$.

The height restricting face 104$h$2 and the step face 224$h$ maintain a suitable distance between the magnet 101 and a chucking plate 223, which prevents the clamper 100 and the spindle motor 220 from being subjected to excessive chucking force. The distance G12 (disk holding gap) between the clamper 100 and the turntable 224 here is less than the thickness TO of the thinnest disk 10 that is used, so even the thinnest of disks can be held.

When the clamper 100 and the spindle motor 220 are chucked with the disk 10 sandwiched in between, as shown in FIG. 3b, the first convex component 104$c$2 provided on the clamper main body 104 concentrically with the center of the clamper 100 mates with the hole 224$c$ provided in the rotational center of the turntable 224, centering the clamper 100.

The first convex component 104$c$2 is a member having an annular outer peripheral component.

The hole 224$c$ is a member having an annular inner peripheral face, and a motor shaft 225 is inserted in the axial direction lower part of the inner peripheral face.

The first convex component 104$c$2 and the hole 224$c$ reduce vibration caused by imbalance of the clamper 100 when the spindle motor 220 is rotated. Also, the off-centeredness of the clamper 100 and the turntable 224 caused by looseness between the first convex component 104$c$2 and the hole 224$c$ here must be low enough that not only will rotation of the spindle motor 220 cause no vibration, but also the clamper 100 will not touch the clamper holder 301.

Configuring the clamper 100 such that height restriction and centering can be performed with respect to both the spindle motor 210 and the spindle motor 220 allows the clamper 100 to be used for both the spindle motor 210 and the spindle motor 220, which means that a disk device can be provided at lower cost.

Figure 4:
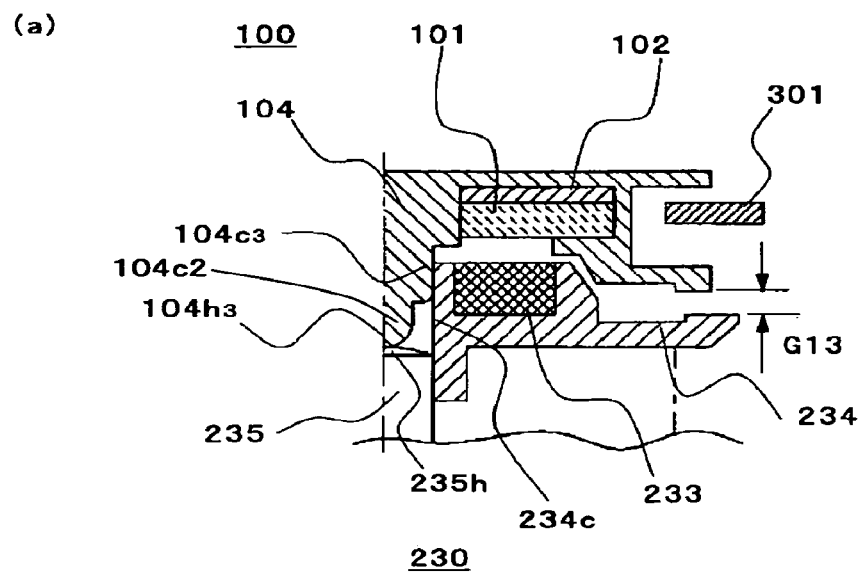
FIG. 4 is a partial lateral cross section of when the clamper in FIG. 2 is used in combination with another spindle motor.
Figure 4:
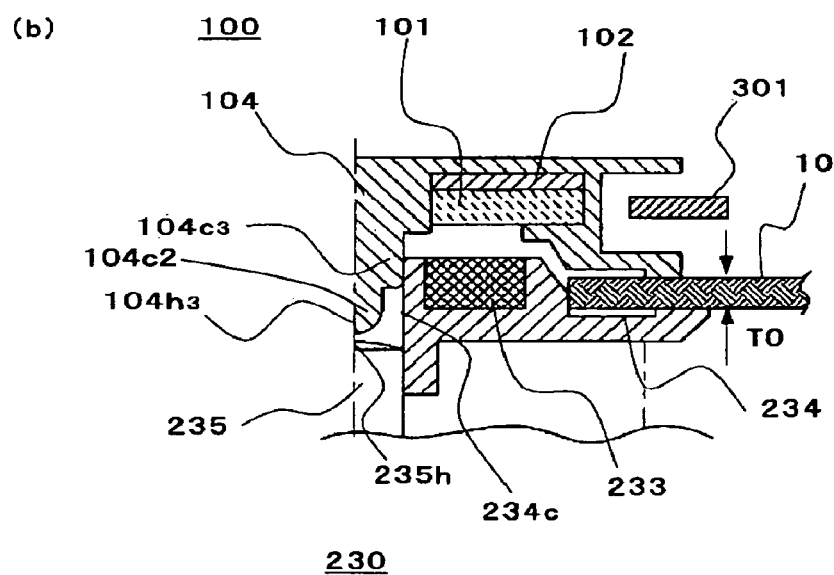

FIG. 4 is a partial lateral cross section of when the clamper 100 in FIG. 2 is used in combination with another spindle motor 230. Those constituent elements in FIG. 4 that are the same as in FIG. 2 are numbered the same and will not be described again. When the clamper 100 and spindle motor 230 have been chucked when there is no disk 10, as shown in FIG. 4a, a height restricting face 104$h$3 provided on the clamper main body 104 hits a distal end 235$h$ of a motor shaft 235 of the spindle motor 230, thereby performing the height positioning of the clamper 100.

The height restricting face 104$h$3 is provided on the axial direction lower end of the first convex component 104$c$2. The first convex component 104$c$2 is a member whose diameter gradually decreases toward the axial direction lower side, and the outer peripheral face of the first convex component 104$c$2 near the height restricting face 104$h$3 is a substantially spherical face. This is just an example, however, and the shape of the first convex component 104$c$2 is not limited to this.

The distal end 235$h$ is provided on the axial direction upper end of the motor shaft 235. The distal end 235$h$ is, for example, a curved face.

The height restricting face 104$h$3 and the distal end 235$h$ maintain a suitable distance between the magnet 101 and a chucking plate 233, which prevents the clamper 100 and the spindle motor 230 from being subjected to excessive chucking force. The distance G13 (disk holding gap) between the clamper 100 and the turntable 224 here is less than the thickness TO of the thinnest disk 10 that is used, so even the thinnest of disks can be held.

When the clamper 100 and the spindle motor 230 are chucked with the disk 10 sandwiched in between, as shown in FIG. 4b, the second convex component 104$c$3 provided on the clamper main body 104 concentrically with the center of the clamper 100 mates with a hole 234$c$ provided in the rotational center of a turntable 234, centering the clamper 100.

The second convex component 104$c$3 is a member having an annular outer peripheral face.

The hole 234$c$ is a member having an annular inner peripheral face, and the motor shaft 235 is inserted into the axial direction lower part of the inner peripheral face.

The second convex component 104$c$3 and the hole 234$c$ reduce vibration caused by imbalance of the clamper 100 when the spindle motor 230 is rotated. The off-centeredness of the clamper 100 and the turntable 234 caused by looseness between the second convex component 104$c$3 and the hole 234$c$ here must be low enough that not only will rotation of the spindle motor 230 cause no vibration, but also the clamper 100 will not touch the clamper holder 301.

Thus constituting the clamper 100 such that height restriction and centering can be performed with respect to both the spindle motor 210 and the spindle motor 230 allows the clamper 100 to be used for both the spindle motor 210 and the spindle motor 230, which means that a disk device can be provided at lower cost.

Figure 5:
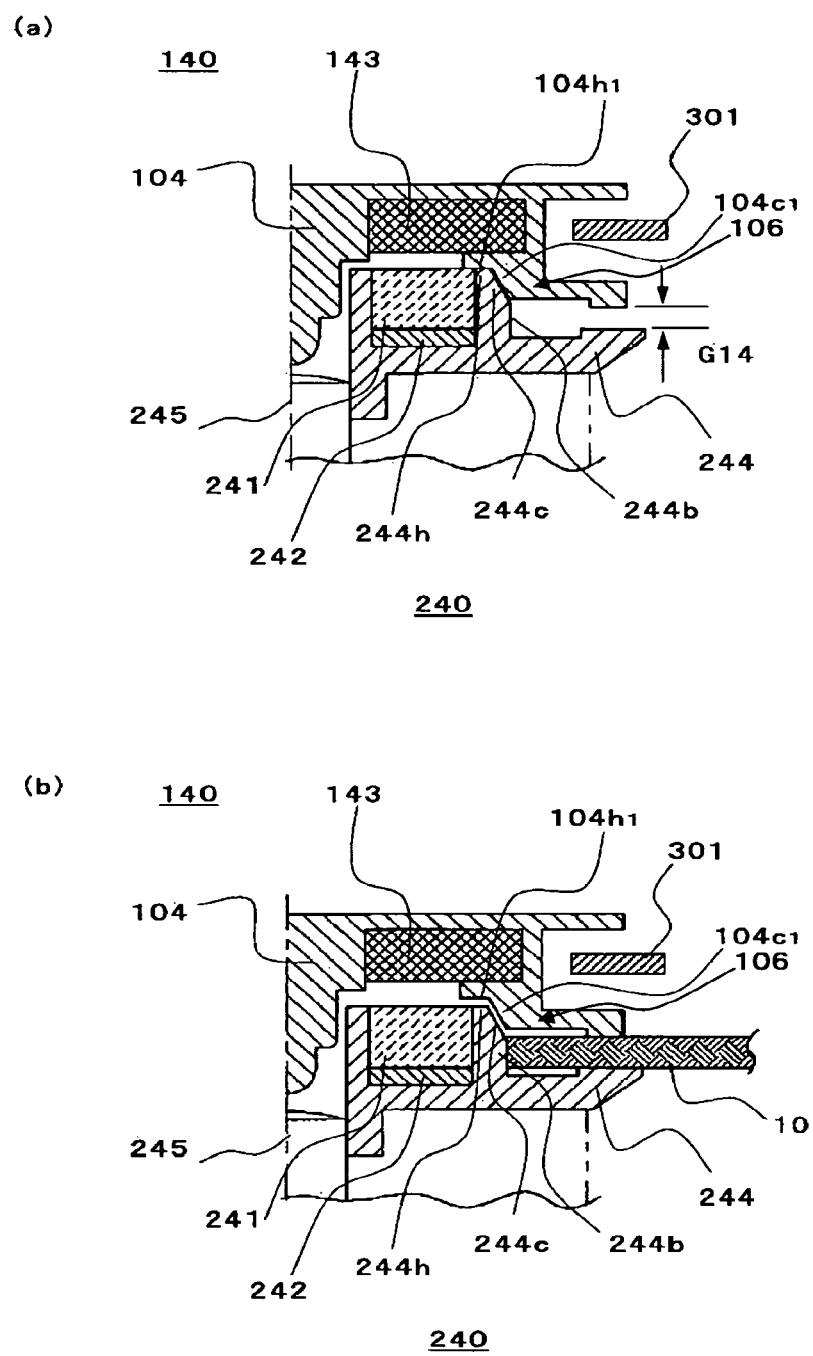
FIG. 5 is a partial lateral cross section of when the clamper in FIG. 2 is used in combination with another spindle motor.

FIG. 5 is a partial lateral cross section of the main components when the clamper main body 104 in FIG. 2 is used in combination with another spindle motor 240. Those constituent elements in FIG. 5 that are the same as in FIG. 2 are numbered the same and will not be described again. What is different from FIG. 2 is that a magnet 241 and a back yoke 242, rather than a chucking plate, are fitted into the spindle motor 240. Correspondingly, a chucking plate 143, rather than a magnet, is fitted into the clamper main body 104, resulting in a clamper 140.

When the clamper 140 and spindle motor 240 have been chucked when there is no disk 10, as shown in FIG. 5a, the height restricting face 104$h$1 provided on the clamper main body 104 hits a ceiling face 244$h$ of a boss 244$b$ of a turntable 244, thereby performing the height positioning of the clamper 140.

The height restricting face 104$h$1 is an annular face facing downward in the axial direction and formed on the annular positioning component 106 provided at the outer edge of the clamper main body 104. The annular positioning component 106 primarily includes the height restricting face 104h1 and the concave conical component 104c1 having an inclined face that spreads out downward in the axial direction. As a result, the annular positioning component 106 constitutes a concave truncated conical component disposed concentrically with the rotational center.

The ceiling face 244h is an annular face provided on the outer peripheral side of the axial direction upper side of the boss 244b. A truncated conical shape 244c having an inclined face that extends while spreading out downward in the axial direction from the outer peripheral edge of the ceiling face 244h is formed on the boss 244b. As a result, the boss 244b constitutes a convex truncated conical component disposed concentrically with the rotational center.

The height restricting face 104h1 and the ceiling face 244h maintain a suitable distance between the magnet 241 and the chucking plate 143, which prevents the clamper 140 and the spindle motor 240 from being subjected to excessive chucking force. The distance G14 (disk holding gap) between the turntable 244 and the clamper 140 here is less than the thickness T0 of the thinnest disk 10 that is used, so even the thinnest of disks can be held.

When the clamper 140 and the spindle motor 240 are chucked with the disk 10 sandwiched in between, as shown in FIG. 5b, the concave conical component 104c1 provided on the clamper main body 104 concentrically with the center of the clamper 140 mates with the truncated conical shape 244c provided on the boss 244b that is concentric with the rotational center of the spindle motor 240, centering the clamper 140.

This reduces vibration caused by imbalance of the clamper 140 when the spindle motor 240 is rotated. The off-centeredness of the clamper 140 and the spindle motor 240 caused by looseness between the truncated conical shape 244c and the concave conical component 104c1 here must be low enough that not only will rotation of the spindle motor 240 cause no vibration, but also the clamper 140 will not touch the clamper holder 301.

Thus putting the chucking plate 143, rather than the magnet, into the clamper main body 104, and constituting such that height restriction and centering can be performed with respect to both the spindle motor 210 and the spindle motor 240 allows the clamper main body 104 to be used for both the spindle motor 210 and the spindle motor 240, which means that a disk device can be provided at lower cost.

Figure 6:
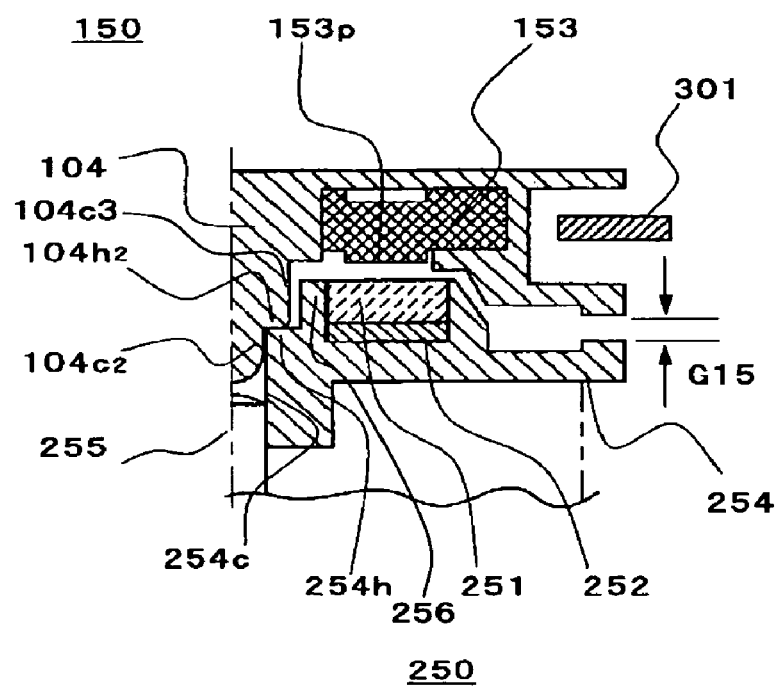
FIG. 6 is a partial lateral cross section of when the clamper in FIG. 5 is used in combination with another spindle motor.

FIG. 6 is a partial lateral cross section of the main components when the clamper main body 104 in FIG. 5 is used in combination with another spindle motor 250. Those constituent elements in FIG. 6 that are the same as in FIG. 5 are numbered the same and will not be described again. What is different from FIG. 5 is that since the position of a magnet 251 of a the spindle motor 250 is low, in order to obtain adequate chucking force, a chucking plate 153 provided with a convex component 153p produced by coining toward the magnet 251 is fitted into the clamper main body 104, resulting in a clamper 150.

When the clamper 150 and spindle motor 250 have been chucked when there is no disk 10, as shown in FIG. 6, the height restricting face 104h2 provided on the clamper main body 104 hits a step face 254h provided on a turntable 254, thereby performing the height positioning of the clamper 150.

The height restricting face 104h2 is an annular axial direction face that connects the outer peripheral faces of the first convex component 104c2 and the second convex component 104c3 had by a protrusion protruding at the rotational center of the clamper main body 104. The second convex component 104c3 here is a columnar member provided concentrically with the rotational center of the clamper main body 104. The first convex component 104c2 is a member provided concentrically adjacent to the axial direction lower side of the second convex component 104c3, and is smaller in diameter than the second convex component 104c3.

The step face 254h is an annular axial direction face that connects the inner peripheral face of a hole 254c provided in the rotational center of the turntable 254 and the inner peripheral face of an annular component 256 that is adjacent on the axial direction upper side of the hole 254c and is larger in diameter than the hole 254c.

The height restricting face 104h2 and the step face 254h maintain a suitable distance between the magnet 251 and the chucking plate 153, which prevents the clamper 150 and the spindle motor 250 from being subjected to excessive chucking force. The distance G15 (disk holding gap) between the clamper 150 and the turntable 254 here is less than the thickness T0 of the thinnest disk 10 that is used, so even the thinnest of disks can be held.

Although not depicted, when the clamper 150 and the spindle motor 250 are chucked with the disk 10 sandwiched in between, the first convex component 104c2 provided on the clamper main body 104 concentrically with the center of the clamper 150 mates with a hole 254c provided in the rotational center of the turntable 254, centering the clamper 150.

This reduces vibration caused by imbalance of the clamper 150 when the spindle motor 250 is rotated. The off-centeredness of the clamper 150 and the spindle motor 250 caused by looseness between the first convex component 104c2 and the hole 254c here must be low enough so that not only will rotation of the spindle motor 250 cause no vibration, but also the clamper 150 will not touch the clamper holder 301.

Thus, a disk device can be provided at lower cost by putting the chucking plate 153 provided with the convex component 153p that corresponds to the distance from the magnet 251 of the spindle motor 250 into the clamper main body 104, and providing a configuration in which the height restriction and centering can be performed at the proper chucking force with respect to both the spindle motor 210 and the spindle motor 250 to allow the clamper main body 104 to be used for both the spindle motor 210 and the spindle motor 250.

This configuration is particularly effective when it is difficult to provide the spindle motor 250 with a powerful magnet. Specifically, if the functionality of the spindle motor is increased, then even if it is difficult to provide the spindle motor 250 with a large magnet, if the clamper is equipped with the chucking plate 153 shaped so as to protrude in the direction of the spindle motor 250 (downward in the axial direction), the proper chucking force can still be obtained.

Figure 7:
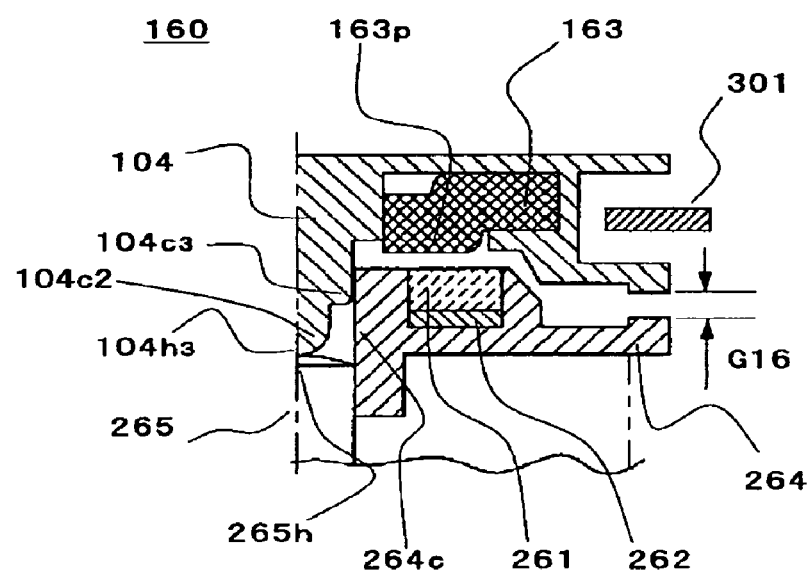
FIG. 7 is a partial lateral cross section of when the clamper in FIG. 5 is used in combination with another spindle motor.

FIG. 7 is a partial lateral cross section of the main components when the clamper main body 104 in FIG. 5 is used in combination with another spindle motor 260. Those constituent elements in FIG. 7 that are the same as in FIG. 5 are numbered the same and will not be described again. What is different from FIG. 5 is that a magnet 261 of the spindle motor 260 is positioned low and is small, so in order to obtain adequate chucking force, a chucking plate 163 provided with a convex component 163p produced by being drawn larger toward the magnet 261 is fitted into the clamper main body 104, resulting in a clamper 160.

When the clamper 160 and spindle motor 260 have been chucked when there is no disk 10, as shown in FIG. 7, the height restricting face 104c3 provided on the clamper main body 104 hits a distal end 265h of a motor shaft 265 of the spindle motor 260, thereby performing the height positioning of the clamper 160.

The height restricting face 104c3 is provided on the axial direction lower end of the first convex component 104c2. The first convex component 104c2 is a member whose diameter gradually decreases toward the axial direction lower side, and the outer peripheral face of the first convex component 104c2 near the height restricting face 104c3 is a substantially spherical face. This is just an example, however, and the shape of the first convex component 104c2 is not limited to this.

The distal end 265h is provided on the axial direction upper end of the motor shaft 265. The distal end 265h is, for example, a curved face.

The height restricting face 104c3 and the distal end 265h maintain a suitable distance between the magnet 261 and the chucking plate 163, which prevents the clamper 160 and the spindle motor 260 from being subjected to excessive chucking force. The distance G16 (disk holding gap) between the clamper 160 and a turntable 264 here is less than the thickness TO of the thinnest disk 10 that is used, so even the thinnest of disks can be held.

Although not depicted, when the clamper 160 and the spindle motor 260 are chucked with the disk 10 sandwiched in between, the second convex component 104c3 provided on the clamper main body 104 concentrically with the center of the clamper 160 mates with a hole 264c provided in the rotational center of the turntable 264, centering the clamper 160.

The second convex component 104c3 is a member having an annular outer peripheral face.

The hole 264c is a member having an annular inner peripheral face, and a motor shaft 265 is inserted in the axial direction lower part of the inner peripheral face.

The second convex component 104c3 and the hole 264c reduce vibration caused by imbalance of the clamper 160 when the spindle motor 260 is rotated. Also, the off-centeredness of the clamper 160 and the turntable 264 caused by looseness between the second convex component 104c3 and the hole 264c here must be low enough that not only will rotation of the spindle motor 260 cause no vibration, but also the clamper 160 will not touch the clamper holder 301.

Thus, a disk device can be provided at lower cost by putting the chucking plate 163 provided with the convex component 163p that corresponds to the magnetic force of the magnet 261, or the distance from the magnet 261, of the spindle motor 260 into the clamper main body 104, and providing a configuration in which the height restriction and centering can be performed at the proper chucking force with respect to both the spindle motor 210 and the spindle motor 260 to allow the clamper main body 104 to be used for both the spindle motor 210 and the spindle motor 260.

Thus at least the same clamper main body can be used for a spindle motor fitted with a chucking plate, and for a spindle motor fitted with a magnet, and for spindle motors having different height and planar positioning shapes, which means that a disk device can be provided at lower cost.

Embodiment 2

Figure 8:
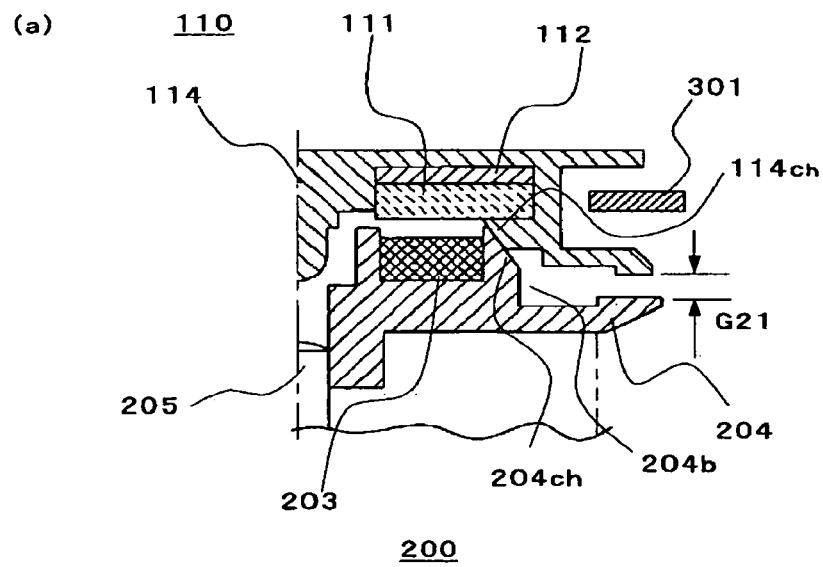
FIG. 8 is a partial lateral cross section of the main components of the spindle motor and clamper in Embodiment 2 of the present invention.
Figure 8:
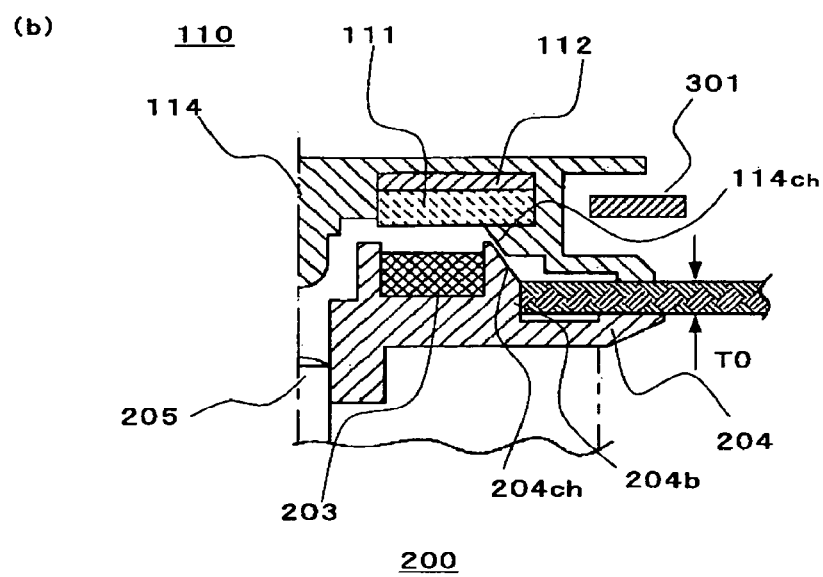

FIG. 8 is a partial lateral cross section of the main components when the spindle motor in Embodiment 2 of the present invention is used in combination with a certain clamper.

Those constituent elements in FIG. 8 that are the same as in FIG. 1 are numbered the same and will not be described again. 110 is a clamper and 200 is a spindle motor. The clamper 110 includes a clamper main body 114 made by resin molding or the like, and a magnet 111 and back yoke 112 that are fitted into the clamper main body 114. The spindle motor 200 includes a motor shaft 205 rotatably supported with respect to a stator (not shown), a turntable 204 fixed to the motor shaft 205, a chucking plate 203 that is fitted into the turntable 204, and so forth.

When the clamper 110 and spindle motor 200 have been chucked when there is no disk 10, as shown in FIG. 8a, the inclined face of a concave conical component 114ch provided on the clamper main body 114 concentrically with the center of the clamper 110 hits a truncated conical shape 204ch that is concentric with the rotational center of the spindle motor 200 and is provided on a boss 204b of the turntable 204, thereby performing the height positioning of the clamper 110.

The concave conical component 114ch is provided on the axial direction lower side on the outer peripheral side of the clamper main body 114, and has an inclined face that spreads out downward in the axial direction.

The truncated conical shape 204ch is provided on the axial direction upper part of the boss 204b, and has an inclined face that spreads out downward in the axial direction.

In the height positioning of the clamper 110, the inclined face of the truncated conical shape 204ch hits the inclined face of the concave conical component 114ch.

This maintains a suitable distance between the magnet 111 and the chucking plate 203, and prevents the clamper 110 and the spindle motor 200 from being subjected to excessive chucking force. The distance G21 (disk holding gap) between the clamper 110 and the turntable 204 here is less than the thickness TO of the thinnest disk 10 that is used, so even the thinnest of disks can be held.

When the clamper 110 and the spindle motor 200 are chucked with the disk 10 sandwiched in between, as shown in FIG. 8b, the concave conical component 114ch provided on the clamper main body 114 mates with the truncated conical shape 204ch, centering the clamper 110.

More specifically, in centering, the inclined face of the truncated conical shape 204ch and the inclined face of the concave conical component 114ch are disposed opposite one another.

This reduces vibration caused by imbalance of the clamper 110 when the spindle motor 200 is rotated. The off-centeredness of the clamper 110 and the spindle motor 200 caused by looseness between the concave conical component 114ch and the truncated conical shape 204ch here must be low enough that not only will rotation of the spindle motor 200 cause no vibration, but also the clamper 110 will not touch the clamper holder 301.

Figure 9:
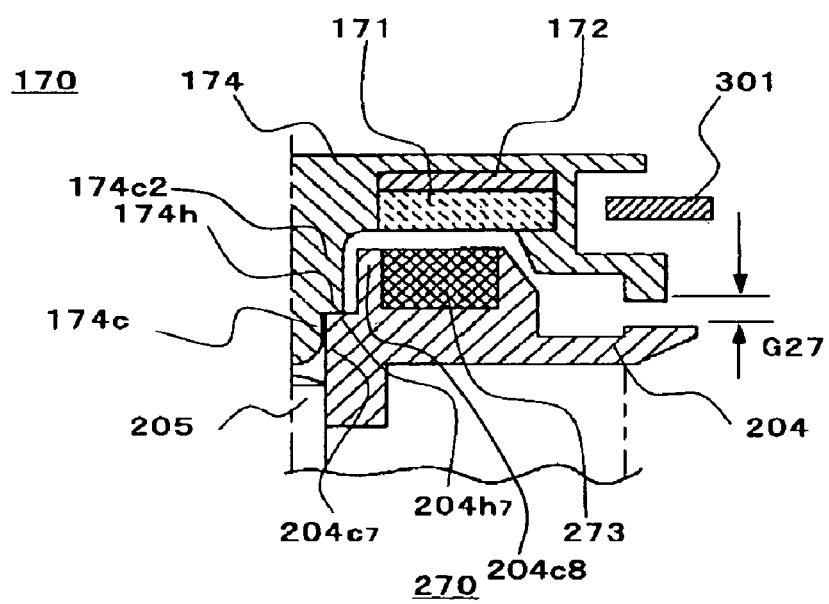
FIG. 9 is a partial lateral cross section of when the spindle motor in FIG. 8 is used in combination with another clamper.

FIG. 9 is a partial lateral cross section of the main components when the spindle motor 200 in FIG. 8 is used in combination with another clamper 170. Those constituent elements in FIG. 9 that are the same as in FIG. 8 are numbered the same and will not be described again. What is different from FIG. 8 is that a magnet 171 of clamper 170 is positioned high, so in order to obtain adequate chucking force, a rather thick chucking plate 273 is fitted into the turntable 204, resulting in a spindle motor 270.

When the clamper 170 and spindle motor 270 have been chucked when there is no disk 10, as shown in FIG. 9, a height restricting face 174h provided on a clamper main body 174 hits a step face 204h7 provided on the turntable 204, thereby performing the height positioning of the clamper 170.

The height restricting face 174h is an annular axial direction face that connects the outer peripheral faces of a large-diameter convex component 174c2 provided concentrically with the rotational center of the clamper main body 174, and a convex component 174c that is smaller in diameter than the large-diameter convex component 174c2 and is disposed continuously and concentrically on the axial direction lower side of the large-diameter convex component 174c2.

The step face 204h7 is an annular axial direction face that connects the inner peripheral face of a first hole 204c7 provided in the rotational center of the turntable 204 and the inner peripheral face of a second hole 204c8 that is adjacent on the axial direction upper side of the first hole 204c7 and is larger in diameter than the first hole 204c7.

The height restricting face 174h and the step face 204h7 maintain a suitable distance between the magnet 171 and the chucking plate 273, which prevents the clamper 170 and the spindle motor 270 from being subjected to excessive chucking force. The distance G27 (disk holding gap) between the clamper 170 and the turntable 204 here is less than the thickness T0 of the thinnest disk 10 that is used, so even the thinnest of disks can be held.

Although not depicted, when the clamper 170 and the spindle motor 270 are chucked with the disk 10 sandwiched in between, the convex component 174c provided on the clamper main body 174 concentrically with the center of the clamper 170 mates with the first hole 204c7 provided in the rotational center of the turntable 204, centering the clamper 170.

The convex component 174c is a member having an annular outer peripheral component.

The first hole 204c7 is a member having an annular inner peripheral face, and the motor shaft 205 is inserted in the axial direction lower part of the inner peripheral face.

The convex component 174c and the first hole 204c7 reduce vibration caused by imbalance of the clamper 170 when the spindle motor 270 is rotated. In addition, the off-centeredness of the clamper 170 and the turntable 204 caused by looseness between the convex component 174c and the first hole 204c7 here must be low enough that not only will rotation of the spindle motor 270 cause no vibration, but also the clamper 170 will not touch the clamper holder 301.

Thus, a disk device can be provided at lower cost by putting the chucking plate 273, which has a thickness corresponding to the distance from the magnet 171 of the clamper 170, in the turntable 204, and providing a configuration in which the height restriction and centering can be performed at the proper chucking force with respect to both the clamper 110 and the clamper 170 to allow the turntable 204 to be used for both the clamper 110 and the clamper 170.

Figure 10:
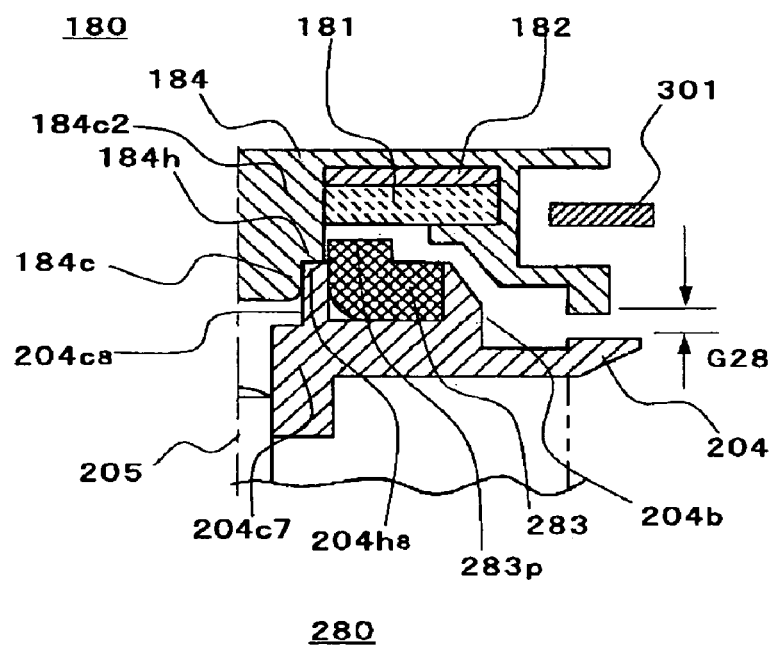
FIG. 10 is a partial lateral cross section of when the spindle motor in FIG. 8 is used in combination with another clamper.

FIG. 10 is a partial lateral cross section of the main components when the spindle motor 200 in FIG. 8 is used in combination with another clamper 180. Those constituent elements in FIG. 10 that are the same as in FIG. 8 are numbered the same and will not be described again. What is different from FIG. 8 is that a magnet 283 of the clamper 180 is positioned even higher, so in order to obtain adequate chucking force, a chucking plate 283 provided with a convex component 283p that is bent toward the magnet 283 is fitted into the turntable 204, resulting in a spindle motor 280.

When the clamper 180 and spindle motor 280 have been chucked when there is no disk 10, as shown in FIG. 10, a height restricting face 184h provided on the clamper main body 184 hits a ceiling face 204h8 of the boss 204b of the turntable 204, thereby performing the height positioning of the clamper 180.

The height restricting face 184h is an annular axial direction face that connects the outer peripheral faces of a large-diameter convex component 184c2 provided concentrically with the rotational center of the clamper main body 184, and a convex component 184c that is smaller in diameter than the large-diameter convex component 184c2 and is disposed continuously and concentrically on the axial direction lower side of the large-diameter convex component 184c2.

The ceiling face 204h8 is an annular face provided on the inner peripheral side of the axial direction upper side of the boss 204b. The inner peripheral edge of the ceiling face 204h8 is continuous with the upper end of the inner peripheral face of the second hole 204c8.

The height restricting face 184h and the ceiling face 204h8 maintain a suitable distance between the magnet 181 and the chucking plate 283, which prevents the clamper 180 and the spindle motor 280 from being subjected to excessive chucking force. The distance G28 (disk holding gap) between the clamper 180 and the turntable 204 here is less than the thickness T0 of the thinnest disk 10 that is used, so even the thinnest of disks can be held.

Although not depicted, when the clamper 180 and the spindle motor 280 are chucked with the disk 10 sandwiched in between, the convex component 184c provided on the clamper main body 184 concentrically with the center of the clamper 180 mates with the second hole 204c8 provided in the rotational center of the turntable 204, centering the clamper 180.

The convex component 184c is a member having an annular outer peripheral face.

The second hole 204c8 is provided in the rotational center of the turntable 204, is adjacent on its inner peripheral face on the axial direction upper side of the first hole 204c7 in which the motor shaft 205 is inserted, and has an inner peripheral face that is larger in diameter than the inner peripheral face of the first hole 204c7.

The convex component 184c and the second hole 204c8 reduce vibration caused by imbalance of the clamper 180 when the spindle motor 280 is rotated. Also, the off-centeredness of the clamper 180 and the turntable 204 caused by looseness between the convex component 184c and the second hole 204c8 here must be low enough that not only will rotation of the spindle motor 280 cause no vibration, but also the clamper 180 will not touch the clamper holder 301.

Thus, a disk device can be provided at lower cost by putting the chucking plate 183 provided with the convex component 283p that is bent corresponding to the distance from the magnet 281 of the clamper 180 into the turntable 204, and providing a configuration in which the height restriction and centering can be performed at the proper chucking force with respect to both the clamper 110 and the clamper 180 to allow the turntable 204 to be used for both the clamper 110 and the clamper 180.

Figure 11:
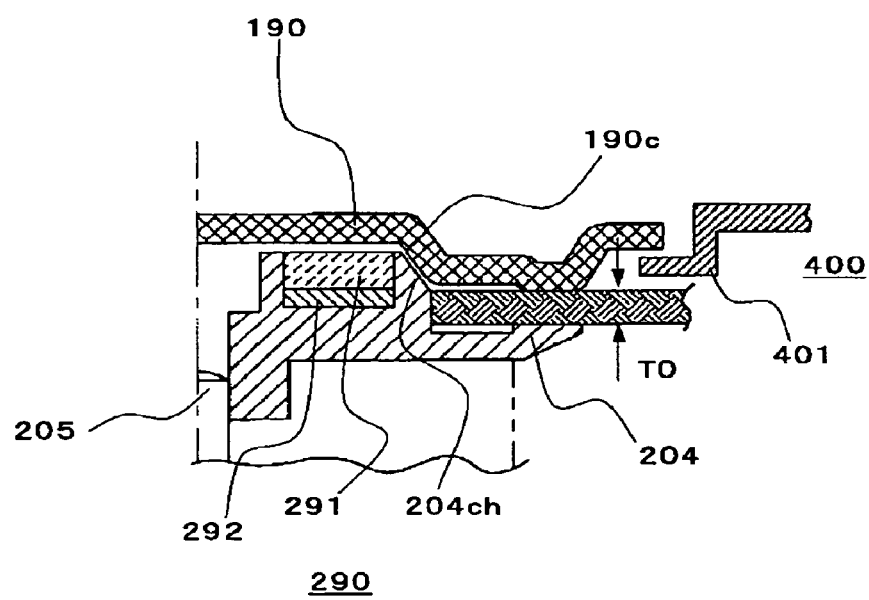
FIG. 11 is a partial lateral cross section of when the spindle motor in FIG. 8 is used in combination with another clamper.

FIG. 11 is a partial lateral cross section of the main components when the spindle motor 200 in FIG. 8 is used in combination with another clamper 190. This clamper 190 is supported by a clamper holder 401 fixed to a cartridge 400 and housed along with the disk 10 in the cartridge 400. Those constituent elements in FIG. 11 that are the same as in FIG. 8 are numbered the same and will not be described again. What is different from FIG. 8 is that the clamper 190 is a chucking plate such as an iron plate that has been shaped by drawing or the like. Correspondingly, a magnet 291 and a back yoke 292, rather than a chucking plate, are fitted into the turntable 204, resulting in a spindle motor 290.

Since the clamper 190 is always housed inside the cartridge 400, the clamper 190 will never be chucked to the spindle motor 290 when there is no disk 10. Therefore, when the clamper 190 and the spindle motor 290 are chucked with the disk 10 sandwiched in between, a concave conical component 190c provided concentrically with the center of the clamper 190 mates with the truncated conical shape 204ch, centering the clamper 190.

The concave conical component 190c has an inclined face that spreads out downward in the axial direction.

The truncated conical shape 204ch is provided on the axial direction upper part of the boss 204b, and has an inclined face that spreads out downward in the axial direction.

In the centering of the clamper 190, the inclined face of the truncated conical shape 204ch and the inclined face of the concave conical component 190c are disposed opposite one another.

This reduces vibration caused by imbalance of the clamper 190 when the spindle motor 290 is rotated. The off-centeredness of the clamper 190 and the turntable 204 caused by looseness between the concave conical component 190c and the truncated conical shape 204ch here must be low enough that not only will rotation of the spindle motor 290 cause no vibration, but also the clamper 190 will not touch the clamper holder 301.

Thus a disk device can be provided at lower cost by putting the magnet 291, rather than a chucking plate, in the turntable 204, and providing a configuration in which the height restriction and centering can be performed at the proper chucking force with respect to both the clamper 110 and the clamper 190 to allow the turntable 204 to be used for both the clamper 110 and the clamper 190.

Other (1) The truncated conical shape shown in FIGS. 1, 2, 5, 8, and 11 may be used not only for the centering of the clamper, but also for guiding the disk when it is being inserted.

(2) The convex component of the chucking plate in FIGS. 6, 7, 10, and 11 was produced by coining, drawing, or bending, but may instead be worked by burring, with a header, or by another similar method, and it should go without saying that a similar convex component may be provided on the magnet instead of the chucking plate, and the chucking force suitably adjusted.

(3) A convex component of the clamper was fitted into a hole in the spindle motor in FIGS. 3, 4, 6, 7, 9, and 10, but it should go without saying that, conversely, a convex component of the spindle motor may be fitted into a hole in the clamper. A spindle motor and clamper having this constitution will be described through reference to FIG. 12.

Figure 12:
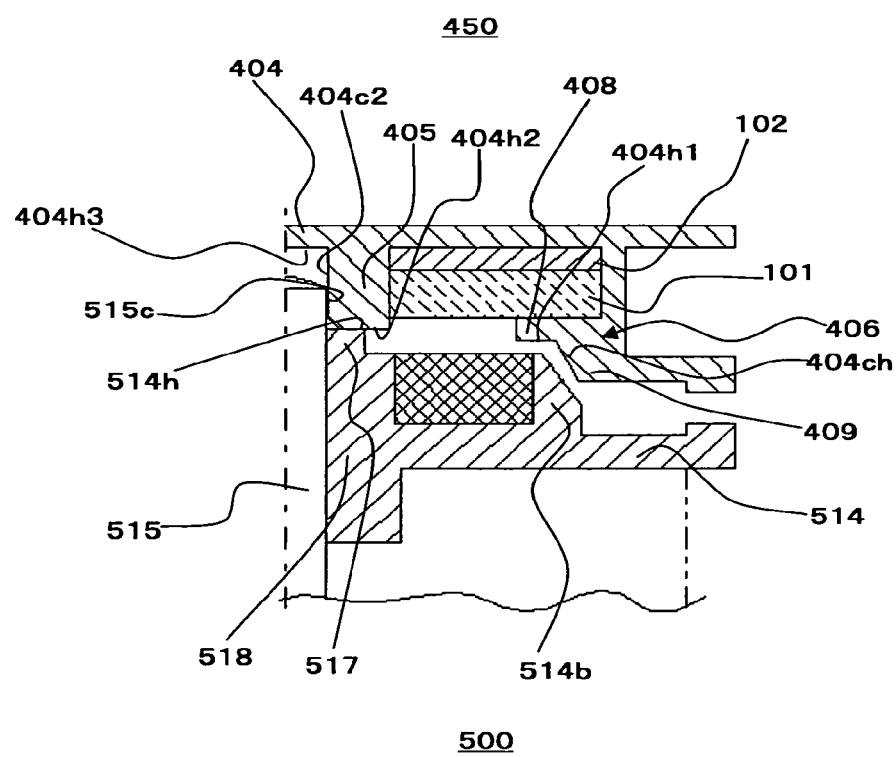
FIG. 12 is a partial lateral cross section of the state in which the spindle motor and clamper have been chucked, as a modification example.

FIG. 12 is a partial lateral cross section of the state in which a clamper 450 and a spindle motor 500 are chucked. Those components that have already been described in the above embodiments are numbered the same and will not be described again.

The clamper 450 includes a clamper main body 404, an annular protrusion 405 disposed concentrically with the rotational center of the clamper main body 404, an annular positioning component 406 provided on the outer peripheral side of the clamper main body 404, and a magnet 101 and back yoke 102 that are fitted into the annular space surrounded by the clamper main body 404, the protrusion 405, and the positioning component 406. The clamper 450 is supported by a clamper holder provided on a disk device (not shown).

The annular protrusion 405 is a member that extends downward in the axial direction from the clamper main body 404. The annular protrusion 405 has a hole 404c2 formed by the annular inner peripheral face on the inner peripheral side, and a height restricting face 404h2 that is an annular axial direction face on the axial direction lower side.

The positioning component 406 includes an annular component 408 having a height restricting face 404h1 that is an annular face that faces the downward in the axial direction on the inner peripheral side, and an inclined component 409 having an inclined face 404ch that extends while spreading out downward in the axial direction from the outer peripheral side of the height restricting face 404h1.

The spindle motor 500 is characterized by having a motor shaft 515 and a turntable 514. The rest of the members are the same as in the spindle motor 210 shown in FIG. 1, and therefore will not be described again.

The motor shaft 515 is inserted, in a state in which the upper end protrudes upward in the axial direction from the turntable 514, into a hole 518 provided in the rotational center of the turntable 514. A boss 514b that is substantially a truncated cone in shape is formed on the turntable 514 concentrically with the rotational center. Further, an annular protrusion 517 that protrudes upward in the axial direction from the top face of the boss 514b is formed on the inner peripheral side of the turntable. The annular protrusion 517 has an annular ceiling face 514h on the axial direction upper side.

When the clamper 450 and the spindle motor 500 are chucked when there is no disk, the height restricting face 404h2 and the ceiling face 514h strike each other in the axial direction, thereby performing the height positioning of the clamper 450 in the axial direction. The upper end of the motor shaft 515 is fitted into the hole 404c2, and the upper end outer peripheral face 515c of the motor shaft 515 strikes the hole 404c2, centering the clamper 450 in the radial direction.

The clamper 450 can be also centered and height positioned when combined with other spindle motors besides the spindle motor 500. For instance, centering in the radial direction can also be performed for other spindle motors by using the inclined face 404ch. Also, height positioning in the axial direction can be performed for other spindle motors by using the inclined face 404ch and the height restricting face 404h3, which is part of the clamper main body 404, on the inner peripheral side of the annular protrusion 405.

Additions

The invention described in the above embodiments can also be expressed as follows.

Addition 1

A spindle motor and a clamper, wherein the spindle motor holds and rotates a disk, the clamper is positioned in the disk planar direction by the spindle motor and clamps a disk between itself and the spindle motor, and the clamper can be positioned in the disk planar direction by a different positioning means for a spindle motor other than the above-mentioned spindle motor.

Addition 2

The spindle motor and clamper according to Addition 1, wherein the spindle motor is equipped with a hole provided in the rotational center, and the clamper is equipped with a convex component that is positioned in the disk planar direction by mating with the hole in the spindle motor, and a concave conical component that is positioned in the disk planar direction by mating with a truncated conical shape provided in the rotational center of another spindle motor.

Addition 3

The spindle motor and clamper according to Addition 1, wherein the spindle motor is equipped with a hole provided in the rotational center, and the clamper is equipped with a first convex component that is positioned in the disk planar direction by mating with the hole in the spindle motor, and a second convex component that is positioned in the disk planar direction by mating with a hole of a different size in another spindle motor.

Addition 4

A spindle motor and a clamper, wherein the spindle motor holds and rotates a disk, the clamper is positioned in the disk planar direction to the spindle motor and clamps a disk between itself and the spindle motor, and the spindle motor can perform positioning in the disk planar direction by a different positioning means for a clamper other than the above-mentioned clamper.

Addition 5

The spindle motor and clamper according to Addition 4, wherein the spindle motor is equipped with a hole provided in the rotational center, and the spindle motor is equipped with a hole that is positioned in the disk planar direction by mating with a convex component provided in the rotational center of the clamper, and a truncated conical shape that is positioned in the disk planar direction by mating with a concave conical component provided on another clamper.

Addition 6

The spindle motor and clamper according to Addition 4, wherein the spindle motor is equipped with a hole provided in the rotational center, and the spindle motor is equipped with a first hole that performs positioning in the disk planar direction by mating with a convex component provided in the rotational center of the clamper, and a second hole that performs positioning in the disk planar direction by mating with a convex component of a different size of another clamper.

Addition 7

The spindle motor and clamper according to Addition 2 or 5, wherein the truncated conical shape provided on the boss of the spindle motor also serves to guide the disk as the boss is being fitted into the center hole of the disk.

Addition 8

A spindle motor and clamper, wherein the spindle motor holds and rotates a disk, the clamper clamps a disk between itself and the spindle motor, and when the above-mentioned spindle motor and the clamper are chucked with no disk in between, the clamper is positioned in the disk thickness direction by a restricting means, but when another spindle motor and the clamper are chucked, the clamper is positioned in the disk thickness direction by a different positioning means.

Addition 9

A spindle motor and clamper, wherein the spindle motor holds and rotates a disk, the clamper clamps a disk between itself and the spindle motor, and when the above-mentioned spindle motor and the clamper are chucked with no disk in between, the spindle motor is positioned with respect to the clamper in the disk thickness direction by a restricting means, but when another spindle motor and the clamper are chucked, the clamper can be positioned in the disk thickness direction by a different positioning means.

Addition 10

A spindle motor and clamper, wherein the spindle motor holds and rotates a disk, the clamper clamps a disk between itself and the spindle motor by magnetic force, and a convex component is provided by drawing, coining, burring, or bending on part of a magnetic body housed inside the clamper, so that the proper chucking force is also applied to a magnetic body housed inside another spindle motor besides the above-mentioned spindle motor.

Addition 11

A spindle motor and clamper, wherein the spindle motor holds and rotates a disk, the clamper clamps a disk between itself and the spindle motor by magnetic force, and a convex component is provided by drawing, coining, burring, or bending on part of a magnetic body housed inside the spindle motor, so that the proper chucking force is also applied to a magnetic body housed inside another clamper besides the above-mentioned clamper.

Description of the Additions

In order to solve the above-mentioned problems encountered with prior art, the spindle motor and clamper of the present invention are such that the clamper can be positioned with respect to another spindle motor in the disk planar direction by a different positioning means.

In a preferred embodiment, the spindle motor is equipped with a hole provided in the rotational center, and the clamper is equipped with a convex component that is positioned in the disk planar direction by mating with the hole in the spindle motor, and a concave conical component that is positioned in the disk planar direction by mating with a truncated conical shape provided in the rotational center of another spindle motor.

In a preferred embodiment, the spindle motor is equipped with a hole provided in the rotational center, and the clamper is equipped with a first convex component that is positioned in the disk planar direction by mating with the hole in the spindle motor, and a second convex component that is positioned in the disk planar direction by mating with a hole of a different size in another spindle motor.

Also, the spindle motor and clamper of the present invention are such that the spindle motor holds and rotates a disk, the clamper is positioned in the disk planar direction to the spindle motor and clamps a disk between itself and the spindle motor, and the spindle motor can perform positioning in the disk planar direction by a different positioning means for a clamper other than the above-mentioned clamper.

In a preferred embodiment, the spindle motor is equipped with a hole provided in the rotational center, and the spindle motor is equipped with a hole that is positioned in the disk planar direction by mating with a convex component provided in the rotational center of the clamper, and a truncated conical shape that is positioned in the disk planar direction by mating with a concave conical component provided on another clamper.

In a preferred embodiment, the spindle motor is equipped with a hole provided in the rotational center, and the spindle motor is equipped with a first hole that performs positioning in the disk planar direction by mating with a convex component provided in the rotational center of the clamper, and a second hole that performs positioning in the disk planar direction by mating with a convex component of a different size of another clamper.

In a preferred embodiment, the truncated conical shape provided on the boss of the spindle motor also serves to guide the disk as the boss is being fitted into the center hole of the disk.

Also, the spindle motor and clamper of the present invention are such that the spindle motor holds and rotates a disk, the clamper clamps a disk between itself and the spindle motor, and when the above-mentioned spindle motor and the clamper are chucked with no disk in between, the clamper is positioned in the disk thickness direction by a restricting means, but when another spindle motor and the clamper are chucked, the clamper is positioned in the disk thickness direction by a different positioning means.

Also, the spindle motor and clamper of the present invention are such that the spindle motor holds and rotates a disk, the clamper clamps a disk between itself and the spindle motor, and when the above-mentioned spindle motor and the clamper are chucked with no disk in between, the spindle motor is positioned with respect to the clamper in the disk thickness direction by a restricting means, but when another spindle motor and the clamper are chucked, the clamper can be positioned in the disk thickness direction by a different positioning means.

Also, the spindle motor and clamper of the present invention are such that the spindle motor holds and rotates a disk, the clamper clamps a disk between itself and the spindle motor by magnetic force, and a convex component is provided by drawing, coining, burring, or bending on part of a magnetic body housed inside the clamper, so that the proper chucking force is also applied to a magnetic body housed inside another spindle motor besides the above-mentioned spindle motor.

Also, the spindle motor and clamper of the present invention are such that the spindle motor holds and rotates a disk, the clamper clamps a disk between itself and the spindle motor by magnetic force, and a convex component is provided by drawing, coining, burring, or bending on part of a magnetic body housed inside the spindle motor, so that the proper chucking force is also applied to a magnetic body housed inside another clamper besides the above-mentioned clamper.

The clamper pertaining to the present invention can be utilized for a plurality of types of spindle motor, and the spindle motor can be utilized for a plurality of types of clamper, which allows a DVD, CD, or other such disk device to be manufactured at lower cost. The present invention can also be used in applications such as testing devices in the course of manufacturing a disk device.

The invention claimed is:

1. A disk device, comprising:
a clamper; and
a spindle motor, said spindle motor including:
a disk holding component, having a main body configured to hold a disk between said main body and said clamper, and a plurality of positioning components on said main body for relative positioning of said spindle motor and said clamper in a radial direction of said spindle motor; and
a motor main body fixed to the said holding component and being configured to rotationally drive said disk holding component and the disk, wherein
said plurality of positioning components includes a first positioning component and a second positioning component, and said first positioning component of said plurality of positioning components of said spindle motor is configured to position said clamper and said spindle motor in the radial direction only when said second positioning component of said plurality of positioning components of said spindle motor does not position said clamper and said spindle motor in the radial direction.

2. The disk device according to claim 1, wherein said plurality of positioning components of said spindle motor comprise a hole in a rotational center of said spindle motor configured to mate with a convex component in a rotational center of said clamper, and an annular inclined convex component configured to mate with an annular inclined concave component on said clamper, and
said first positioning component is said hole when said second positioning component is said annular inclined convex component, and said first positioning component is said annular inclined convex component when said second positioning component is said hole.

3. The disk device according to claim 1, wherein said plurality of positioning components of said spindle motor includes a first hole in a rotational center of said spindle motor configured to mate with a first convex component in a rotational center of said clamper, and a second hole larger in diameter than said first hole configured to mate with a second convex component in the rotational center of said clamper, and
said first positioning component is said first hole when said second positioning component is said second hole, and said first positioning component is said second hole when said second positioning component is said first hole.

4. A disk device, comprising:
a clamper; and
a spindle motor, including:
a disk holding component, having a main body configured to hold a disk between said main body and a clamper, and a plurality of positioning components on said main body for relative positioning in an axial direction of said spindle motor when said main body and said clamper are in a chucked state with no disk clamped therebetween; and
a motor main body fixed to said disk holding component and being configured to rotationally drive said disk holding component and the disk, wherein
said plurality of positioning components includes a first positioning component and a second positioning component, and said first positioning component of said plurality of positioning components of said spindle motor positions said clamper and said spindle motor in the axial direction only when said second positioning component of said plurality of positioning components of said spindle motor does not position said clamper and said spindle motor in the axial direction.

5. The disk device according to claim 4, wherein said plurality of positioning components of said spindle motor comprises a first restricting component having an annular axial direction face and being disposed in a rotational center of said spindle motor, and a second restricting component that is a convex truncated conical component and is disposed concentrically with said first restricting component,
said first positioning component is said first restricting component when said second positioning component is said second restricting component, and said first positioning component is said second restricting component when said second positioning component is said first restricting component.

* * * * *

UNITED STATES PATENT AND TRADEMARK OFFICE
CERTIFICATE OF CORRECTION

PATENT NO. : 8,099,744 B2  
APPLICATION NO. : 13/016266  
DATED : January 17, 2012  
INVENTOR(S) : Yoshito Saji et al.

Page 1 of 1

It is certified that error appears in the above-identified patent and that said Letters Patent is hereby corrected as shown below:

Title Page, insert

--(30)         Foreign Application Priority Data

October 20, 2003   (JP)........................P2003-358667--

Signed and Sealed this  
Tenth Day of July, 2012

David J. Kappos  
*Director of the United States Patent and Trademark Office*